Figure 1:
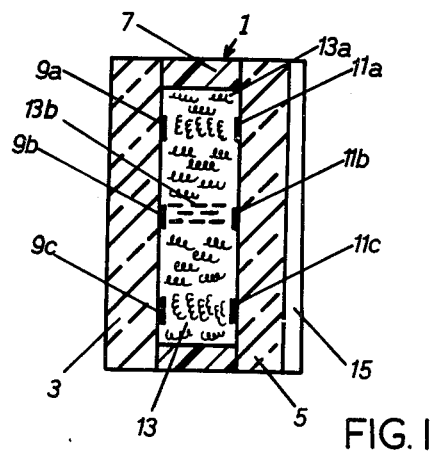

United States Patent [19]

Shanks

[11] 4,211,473

[45] Jul. 8, 1980

[54] LIQUID CRYSTAL DISPLAY DEVICES

[75] Inventor: Ian A. Shanks, Malvern, England

[73] Assignee: The Secretary of State for Defence in Her Britannic Majesty's Government of the United Kingdom of Great Britain and Northern Ireland, London, England

[21] Appl. No.: 29,412

[22] Filed: Apr. 12, 1979

[30] Foreign Application Priority Data

Apr. 12, 1978 [GB] United Kingdom ............... 14425/78

[51] Int. Cl.$^2$ .......................... G02F 1/13; C09K 3/34
[52] U.S. Cl. .................................. 350/337; 350/338; 350/345; 350/349; 252/299
[58] Field of Search ................ 252/299; 350/337, 338, 350/345, 346, 347, 349

[56] References Cited

U.S. PATENT DOCUMENTS

| | | | |
|---|---|---|---|
| 3,844,637 | 10/1974 | Masi | 252/299 |
| 3,960,753 | 6/1976 | Larrabee | 252/299 |
| 3,963,312 | 6/1976 | Wild | 350/337 |
| 4,025,164 | 5/1977 | Doriguzzi et al. | 350/337 |
| 4,032,219 | 6/1977 | Constant et al. | 252/299 |
| 4,048,358 | 9/1977 | Shanks | 350/349 |
| 4,054,368 | 10/1977 | Krueger et al. | 350/345 |
| 4,061,418 | 12/1977 | Poensgen | 350/337 |
| 4,097,130 | 6/1978 | Cole, Jr. | 350/349 |
| 4,111,534 | 9/1978 | Cirkler et al. | 350/345 |
| 4,128,313 | 12/1978 | Cole, Jr. et al. | 350/349 |
| 4,142,781 | 3/1979 | Baur et al. | 350/338 |
| 4,145,114 | 3/1979 | Coates et al. | 252/299 |

FOREIGN PATENT DOCUMENTS

| | | | |
|---|---|---|---|
| 2422784 | 11/1974 | Fed. Rep. of Germany | 350/337 |
| 2707296 | 9/1977 | Fed. Rep. of Germany | 350/349 |
| 2748066 | 5/1978 | Fed. Rep. of Germany | 350/337 |
| 2832537 | 2/1979 | Fed. Rep. of Germany | 350/338 |
| 2837218 | 3/1979 | Fed. Rep. of Germany | 252/299 |
| 2848421 | 5/1979 | Fed. Rep. of Germany | 252/299 |
| 1386715 | 3/1975 | United Kingdom | 350/345 |
| 2003289 | 3/1979 | United Kingdom | 350/345 |
| 2003290 | 3/1979 | United Kingdom | 350/345 |

OTHER PUBLICATIONS

Constant, J. et al., "Photostable Anthraquinone Pleochroic Dyes," presented at 7th International L. C. Conf., Bordeaux, France, (Jul. 1978).

Baur, G., et al., Appl. Phys. Lett., vol. 31, No. 1, pp. 4-6, (Jul. 1977).

Larrabee, R. D., RCA Review, vol. 34, pp. 329-336, (1973).

White, D. L., et al., J. Appl. Phys., vol. 45, No. 11, pp. 4718-4722, (1974).

Primary Examiner—Teddy S. Gron
Attorney, Agent, or Firm—Pollock, Vande Sande and Priddy

[57] ABSTRACT

In order to provide a liquid crystal display device having enhanced contrast, pleochroic and fluorescent materials are incorporated in one or more components of the device. The materials are incorporated in balanced proportion and have absorbtion and emission spectra, respectively, that are complementary. Light incident on the display is thus converted so that light reaching the eye from the bright state regions of the display is neutral grey in contrast to the light from the dark state regions, which is strongly attenuated and may be strongly colored.

In particular the pleochroic material may be the dye:

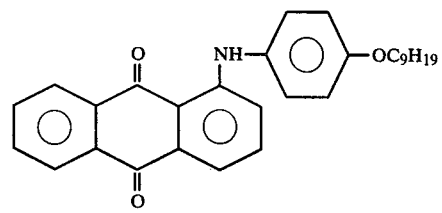

and the fluorescent material, the dye:

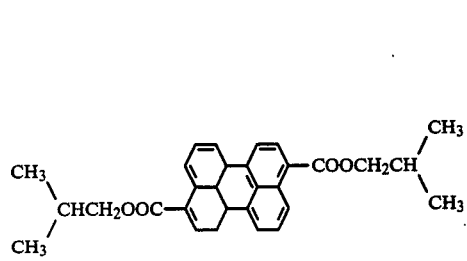
alone or in balanced combination with the dye:
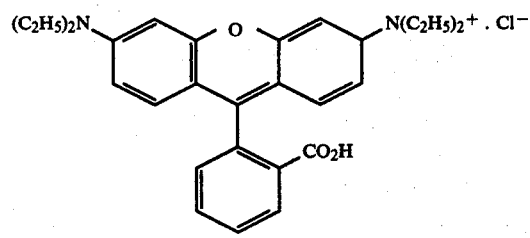
10 Claims, 5 Drawing Figures U.S. Patent    Jul. 8, 1980    Sheet 1 of 3    4,211,473

LIQUID CRYSTAL DISPLAY DEVICES

The present invention relates to liquid crystal display devices, particularly liquid crystal display devices incorporating pleochroic dye.

In a typical liquid crystal display device, a thin layer of liquid crystal material is sandwiched between glass substrates bearing on their inner surfaces transparent and patterned electrode structures. By selectively applying an electric field across the layer of liquid crystal material by means of address potentials applied to the electrode structures or corresponding parts of these structures, an optical property of the liquid crystal layer (for example reflectivity, transmissivity or optical activity) may be changed for distinguishing a display character, corresponding to the addressed electrode structures or parts of those structures, from the remaining background.

It is importat for display applications, that the display should be bright and the contrast (whether monochrome or colour) between the display character and the background should be high. However, because liquid crystal displays, particularly those incorporating polarizers, generally absorb light to some degree, the brightness of such displays, although the contrast may be very high (eg 100:1), is typically quite poor. Colour effects, and improved combinations of contrast and brightness, have been achieved by using one or more selected pleochroic dyes dissolved in the liquid crystal layer, the dye molecules and the liquid crystal molecules co-operating through the known guest-host interaction.

Pleochroic dyes have the physical property that the absorption of plane polarized light varies according to the orientation of individual dye molecules with respect to the direction of polarization of the light incident upon the dye material. When the direction of polarization of the light is parallel to the direction of the long molecular axis of a dye molecule, the light is strongly absorbed. The light absorption, however, is much weaker when the direction of polarization is perpendicular to the direction of the long molecular axis of the dye molecule. Pleochroic dyes selected for use in guest-host liquid crystal display devices, not only exhibit significant absorption differences according to their orientation, but are also typified by the property that the intermolecular interaction between these dye molecules and the molecules of the liquid crystal material, this interaction being referred to as the guest-host interaction, is particularly strong so that the dye molecules may be aligned by the liquid crystal molecules.

Examples of the guest-host display devices are to be found in UK Patent Serial No. 1410329 (cholesteric-nematic phase-change effect devices), and in UK Patent Serial No. 1472247 (twisted nematic (Schadt-Helfrich) effect devices). Other examples of guest-host devices include dynamic scattering effect devices and Freedericksz effect devices also incorporating suitable pleochlroic dye. Further contrast has been achieved by using appropriate mixtures of pleochroic dyes to provide contrasting colour states of neutral tint, as described in UK Patent Serial No. 1507030.

Pleochroic azo dyes have been used in guest-host devices, but though these dyes exhibit strong pleochroism they have unfortunately been relatively sensitive to ultra-violet radiation. A new range of anthraquinone pleochroic dyes, is disclosed in UK Patent Application No. 42810/77. These dyes, though relatively photochemically stable, and thus useful for devices where relatively long operational lifetime is requisite, when incorporated in devices, achieve combinations of brightness and contrast which are not quite as good as obtained with some azo dyes. There is thus a need for a brightness and contrast improvement in these devices.

Polarizers incorporating pleochroic dye have also been used in twisted nematic liquid crystal devices to produce shutters or displays with coloured dark states. Consequential coloration of the bright states in these devices similarly detracts from good brightness and contrast and there is a need for improvement.

According to the present invention there is provided a liquid crystal display device comprising:

A liquid crystal cell including front and rear insulating substrates arranged in parallel, each with an inwardly facing surface bearing an electrode structure, and contained between the substrates, a layer of liquid crystal material, the cell being arranged so that the device is capable of being divided into dark and bright optical state regions upon application of an appropriate electric field across the layer when a potential difference is applied between the electrode structures;

a reflector arranged for reflecting light incident upon the cell and propagated therethrough;

pleochroic means, including at least one pleochroic material;

fluorescent means, including at least one fluorescent material, the fluorescent means having an optical absorbtion band lying approximately within the optical transmission band of the pleochroic means, the fluorescent means also having a corresponding fluorescence emission band lying approximately within the optical absorbtion band of the pleochroic means; and wherein, the pleochroic means and the fluorescent means are capable of co-operating and are arranged to co-operate so that when the light is incident upon the cell and an appropriate electrical field is applied across the layer, light propagated to an observer from any bright state region of the device is of approximately neutral tint.

Preferably the device is a guest-host liquid crystal display device, a quantity of at least one suitable pleochroic dye being dissolved in the layer of liquid crystal material. Here the liquid crystal material may be of suitable cholesteric or nematic material or a mixture of cholesteric and nematic material such that molecules of pleochroic dye and molecules of liquid crystal material may be aligned with each other through guest-host interaction.

The guest-host liquid crystal display device may be constructed and arranged to operate, for example; as a cholesteric to nematic phase change effect device; as a dynamic scattering device; as a twisted nematic (Schadt-Helfrich) device; or, as a Freedericksz effect device; so that the layer is divided into dark and bright optical states upon application of the electric field.

Fluorescent material, as a dye, may be dissolved in the liquid crystal layer. Preferably, the molecules of the dye interact with the molecules of liquid crystal material and so are capable of alignment with these molecules.

Alternatively, or additionally, fluorescent material, as a dye or pigment, may be incorporated in the reflector, in the substrates, or in added polarisers. Preferably, in each case, the molecules of fluorescent material may be aligned in, or to define, a direction of polarization.

Alternatively, the device may be a twisted nematic display device including front and rear polarizers adjacent to the front and rear parallel substrates respectively; a quantity of one or more pleochroic materials being incorporated in, and aligned in the direction of polarization of, at least one of the polarizers; the alignment (at respective substrate surfaces) of the long molecular axes of the molecules of liquid crystal material being orthogonal and such as to define, in the absence of applied electric field, a 90° (or other angle) helical twist arrangement of molecules between substrates; and, the direction of polarization of each polarizer relative to the other and relative to the orthogonal alignment directions of the liquid crystal molecules being such that the layer of liquid crystal material may be divided into dark and bright optical states upon application of appropriate electric field across part of the layer. Here the polarizers may be crossed, or parallel, and may be aligned orthogonal or parallel to the alignment direction of the liquid crystal molecules at the internal surface of one of the substrates. The liquid crystal material may be of nematic material, or of a suitable dilute cholesteric material being a mixture consisting of nematic material and a small amount of cholesteric material.

The electrode structures may each be single electrodes. Alternatively the structures may each comprise a plurality of spatially isolated electrodes suitable for display character selection according to selected electrical address. For example, the isolated electrodes may be arranged each in the form of a seven-bar figure of eight, or the electrodes of each structure may be in the form of rows and columns, respectively, forming a matrix display. By selective address of the electrodes, different numeric or alpha-numeric characters may be displayed.

Preferably at least one pleochroic material is a suitable 1,5 substitution anthraquinone dye or a suitable mixture of 1,5 substitution anthraquinone dyes.

The invention will now be described, by way of example only, with reference to the following drawings in which:

FIG. 1: is a normal plane cross-section of a guest-host cholesteric to nematic phase change liquid crystal device.

Figure 2:
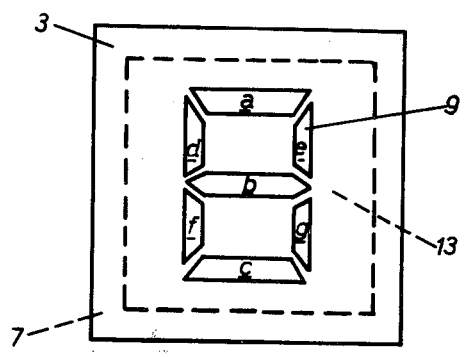

FIG. 2: is an elevation of the device shown in FIG. 1.

Figure 3:
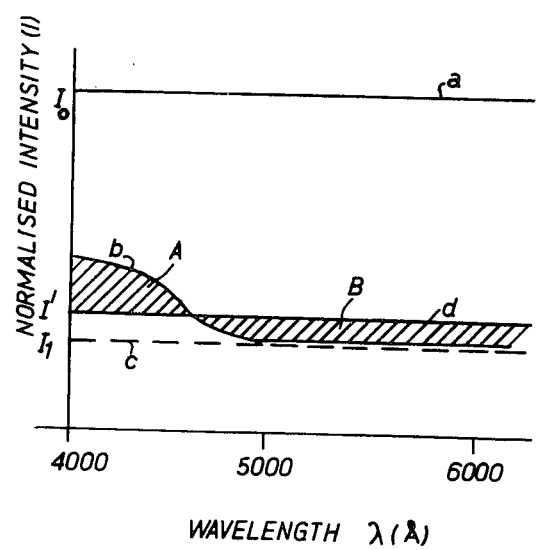

FIG. 3: is an illustrative and idealised graphical representation of observable light intensity characteristics for comparing: a) a conventional device including pleochroic dye, and b) a device embodying the features of the invention.

Figure 4:
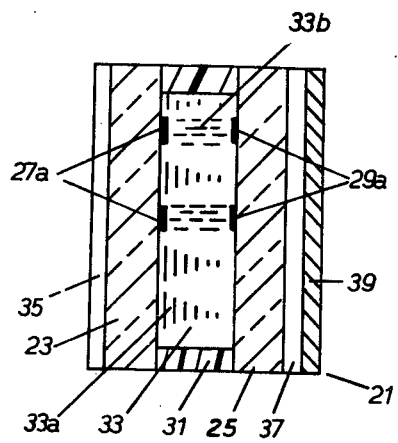

FIG. 4: is a normal plane cross-section of a twisted nematic display device.

Figure 5:
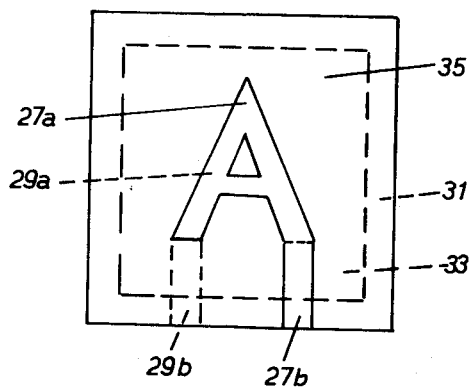

FIG. 5: is a front elevation of the device shown in FIG. 4.

As shown in FIGS. 1 and 2, a cholesteric-to-nematic phase change effect device comprises front and rear transparent glass substrates 3 and 5 respectively. These are separated and sealed together by means of a mylar spacer 7, and bear on their inner surfaces, electrode structures 9, 11 comprising transparent tin oxide electrodes 9a, 9b, ..., 9g and 11a, 11b, ..., 11g, respectively, paired in register, and each arranged in the form of a seven-bar digit structure (details of connecting terminal portions not shown).

Into the interelectrode space has been introduced cholesteric liquid crystal material 13 containing a small percentage by weight of dissolved pleochroic dye. The inner facing exposed surface of substrates 3 and 5 and also the surfaces of electrode structures 9 and 11 have been treated in known manner by detergent cleaning and have been baked dry in an inert atmosphere prior to assembly, so that the molecules of the cholesteric material may adopt a meta-stable focal-conic configuration. Alternative to this treatment, the surfaces of substrates 3 and 5, and the surfaces of electrode structures 9 and 11 can be treated with a surfactant, such as lecithin or organo-silane, or the surfactant may be added in small quantity to the liquid crystal material.

Located at the rear of substrate 5 is a reflector 15, for example a white card.

In this example the cholesteric liquid crystal material comprises 94% by weight of the biphenyl eutectic mixture "E 8" (supplied by BDH Chemical Ltd of Poole, Dorset, England) and 6% by weight of the cholesteric biphenyl material "CB 15" (also supplied by BDH Chemicals Ltd). "E 8" may be further identified as follows:

| Liquid Crystal Mixture - "E 8" | |
|---|---|
| 4-n-Pentyl-4'-cyanobiphenyl | 43% by weight |
| 4-n-Propyloxy-4'-cyanobiphenyl | 17% by weight |
| 4-n-Pentyloxy-4'-cyanobiphenyl | 13% by weight |
| 4-n-Octyloxy-4'-cyanobiphenyl | 17% by weight |
| 4-n-Pentyl-4'-cyanoterphenyl | 10% by weight |

To this cholesteric liquid crystal material is added a quantity of soluble pleochroic dye—the 1,5 substitution anthraquinone dye "D 16" (supplied by BDH Chemicals Ltd) and given by the formula:

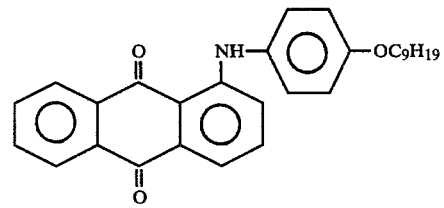

in proportion 0.5 to 2.0% by weight according to layer thickness and to the degree of absorption desired. Typically, 1.7% by weight is chosen for a liquid crystal layer thickness of 12 microns. This dye and its use in liquid crystal devices are described in UK Patent Application No. 42810/77. It is characterised by extensive absorption in the optical spectral range from about 500 to 650 nm with peak absorption in the spectral band 550 to 600 nm and has a characteristic blue coloration.

In this example, the white card reflector 15 is modified by the application of suitable fluorescent material. In particular, the dye Perilene (Fluorol Green-gold), Colour Index No. 59075 given by the formula:

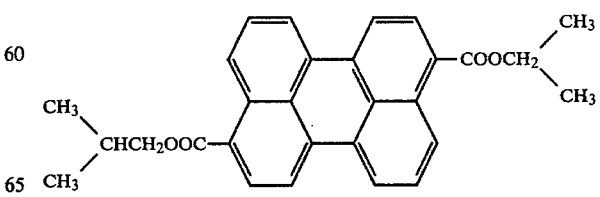

is dissolved in a volatile solvent, eg acetone, and applied by painting lightly on the card 15. The quantity of fluorescent dye applied is controlled and adjusted as described below.

Without this modification, the device described would behave conventionally as follows: in the absence of applied field the liquid crystal molecules 13a adopt the more stable planar configuration ie the long axis of each molecule lying on a helix having an axis normal to the surfaces of substrates 3 and 5. By virtue of the guest-host interaction, the pleochroic dye molecules have an alignment with their respective long molecular axes parallel or near parallel to the surfaces of substrates 3 and 5. Thus, when white light is incident upon the front substrate 3 of the device, the non-blue components of the white light spectrum are strongly absorbed and the light that is back-scattered through front substrate 3, to the eye of an observer, has strong dark blue coloration. However, when an electric field is applied across part of the liquid crystal layer 13, for example by the application of a potential difference between electrodes 9b and 11b, the liquid crystal molecules 13b linked by this field, characterised by a positive dielectric anisotropy, adopt an alignment parallel to the electric field, ie they align with their long molecular axes directed normal to the plane of the liquid crystal layer 13, assuming the nematic phase. By guest-host interaction, the pleochroic dye molecules are also aligned with their long molecular axes normal to the layer. In this case, the absorption of non-blue light components is weaker than previously, and the light is propagated through substrate 5 to the white card reflector 15. Upon diffuse reflection from this white card reflector 15 the light is propagated back across the device to the eye. Though this light reaching the eye is brighter than before, it nevertheless has some blue coloration which detracts from the optimum contrast achievable. In this manner a bright state is associated with that area of the device in the field of view of the eye corresponding to electrode 9b, which may be contrasted with the dark state extending over the remaining background area in the field of view corresponding to the blue coloured back-scattering cholesteric state. A character in the form of a minus sign is thus displayed against background.

When the electric field is removed, the liquid crystal molecules revert to the cholesteric phase, assuming initially a focal conic configuration—ie the long axis of each molecule lies on a helix having an axis parallel to the surfaces of substrates 3 and 5. Again blue light is strongly back-scattered.

However, implementing the modification above ie including a suitable quantity of suitable fluorescent material, the blue coloration corresponding to the bright state may be compensated by converting a proportion of the blue components to components of complementary, or near-complementary colour to give light of an approximately neutral tint.

Exact neutral tint, as a term understood in the art of colour photography, corresponds to light which stimulates the colour receptors of the eye, ie those responsive to red, green and blue respectively, to an equal subjective degree and is an attenuated version of white light. To achieve this ideal would require perfect spectral matching and precise balance of respective quantities, so that just the right amount and colour of light transmitted by the pleochroic dye material is absorbed by the fluorescent dye material and converted into just the right amount and colour of light to produce this effect. This ideal behaviour is illustrated in FIG. 3. The graph has axes calibrated to show subjective intensity "I" against light wavelength "λ(Å)". As there shown white light of intensity "$I_o$" is represented by the line denoted "a". This line represents the normalised subjective response, rather than the measurable, physical intensity. As well known, the eye is most sensitive to yellow-green light and less sensitive to light which is blue or red, at the extremes of the visible spectrum. A typical bright state response expected for an unmodified device is shown by the curve denoted "b". This is peaked in the blue region and tails off for light of longer wave-length towards the red end of the spectrum. By using a mixture of pleochroic dyes, the excess blue or short wave-length coloration may be compensated by absorption, as in for example the mixture of dyes described in UK Patent No 1507030. An idealised representation of this response is shown by the line denoted "c" of normalised intensity "$I_1$". However if, instead of using a combination of pleochroic dyes, a combination of pleochroic and fluorescent dye material is used, neutral tint of somewhat higher intensity "I'" may be achieved, as represented by the idealised line denoted "d". This ideal is attained by the absorption of light of blue colour shown in the shaded area A, which is converted by means of fluorescence into light of longer wave-length shown by area "B".

A reasonable approximation to neutral tint, may be achieved in practical devices, however. Thus in the above example the dye Fluorol Green-gold absorbs light of blue coloration transmitted by the pleochroic dye D 16 and fluoresces by converting this absorbed light into light of longer wave-length (ie greenish yellow) which is complementary or at least nearly so. The concentration of fluorescent dye applied to the white card reflector 15 may be varied by successive applications of the dissolved dye and the optimum contrast and best achievable approximate neutral tint judged by eye.

It is noted that Fluorol Green-gold when dried and concentrated in this manner, exhibits different spectral characteristics compared with its dissolved form. Better results have been obtained by dissolving Fluorol Green-gold in a white paint—eg the correction fluid "Snopake" manufactured by Colyer & Southey (Sales) Limited, available at stationers. The quantity of Fluorol Green-gold added may be varied to give optimum contrast.

It will be appreciated that spectral matching may be further improved and therefore better approximation to neutral tint achieved, by appropriate addition of other pleochroic dye material to the liquid crystal material, or by addition of other fluorescent dye to the reflector. For example a quantity of the fluorescent dye Rhodamine B Colour Index No. 45170 given by the formula:

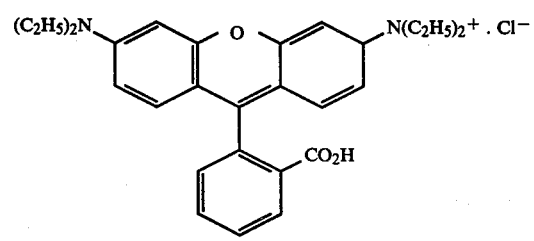

may be dissolved in acetone and added to the mixture of Fluorol Green-gold and white paint "Snopake" to provide additional red compensating components with corresponding absorption of green components, the relative quantities of the fluorescent dyes being balanced to give best contrast.

Alternative to using the white reflector card 15, the back of rear substrate 5 may be painted with white paint. In this case, the fluorescent material may be applied as a pigment or dye mixed with the white paint, or alternatively fluorescent dye may be dissolved in the liquid crystal layer 13. Since the white paint is in close proximity to the glass substrate 5, ie is in good optical contact with it, and provides means for back-scattering light incident upon it, fluorescent light, emitted when dye is dissolved in the liquid crystal layer, may be back-scattered to the eye.

Yet other forms of reflector may be substituted for the tinted white card 15. Thus the reflector 15 may to some extent conserve the polarization of light incident thereon and comprise a card or other supporting sheet painted with aluminum or similar metallic paint, or it could be formed with a combination of a fibrous polystyrene or polypropylene sheet. An alternative scattering reflector may be made from micro-porous polypropylene sheet, wherein the pores have been impregnated with liquid crystal material, and the sheet previously stretched to provide elongated pores with the long molecular axes of the liquid crystals aligned therewith. In this latter case fluorescent dye material may be included by dissolving an appropriate quantity in the liquid crystal material. This sheet could be used on its own as a back-scatterer, or could be supplemented by the additional backing of a polarizer sheet and a mirror or other reflector which conserves polarization eg aluminium paint or fibrous polystyrene or polypropylene as taught in UK Patent Serial No 1509180 (U.S. Pat. Ser. No. 4,048,358).

The reflector may also be constructed using a highly coloured fluorescent card or other scattering reflector and placing a white translucent diffuser in front so that an off-white reflection having the required degree of fluorescent colour is obtained.

As shown in FIGS. 4 and 5, a twisted nematic device 21 includes front and rear parallel glass substrates 23, 25 respectively, each bearing on an internal surface an electrode structure. Each electrode structure 27, 29 respectively has a display portion 27a, 29a in the form of a display character, the letter 'A', and also a connecting portion 27b, 29b. The structures are arranged with the display portions, only, in register with each other. The substrates are separated and sealed together by means of a mylar spacer 31. Into the interelectrode space has been introduced a dilute cholesteric liquid crystal material mixture 33 comprising a nematic material, characterised by a positive dielectric anisotropy, and a small percentage by weight of a miscible cholesteric material. The inner surfaces of substrates 23, 25 and electrode structures 27, 29 have been treated by rubbing each in a single direction and such that upon assembly, the long molecular axes of the liquid crystal molecules adopt in known manner a 90° helical twist configuration 33a. The small percentage of cholesteric material has been added so that the natural sense and pitch of the dilute cholesteric mixture is matched to the sense and pitch of the 90° helical twist configuration as described in UK Patent Specification Nos. 1472247 and 1478592. Adjacent to the outer surfaces of substrates 23, 25 are front and rear polarisers 35, 37. The front polariser 35 is aligned so that its direction of polarisation is parallel with the rubbing direction on the corresponding substrate 23 and thus with the aligned liquid crystal molecules near that substrate. The rear polariser 37 is coloured and contains a linearly oriented pleochroic dye, the dye being characterised by selective absorption of colour components of light, polarised parallel to its transition moment (usually its long axis), in the lower part of the visible spectrum (ie red to green). The molecules of the pleochroic dye are aligned so that their long axes are effectively parallel and define, orthogonal to these axes, a single direction of polarization. Rear polarizer 37 is aligned so that this direction of polarization is parallel to the direction of polarization defined by front polarizer 35. The device is backed by a reflector 39 adjacent rear polarizer 37. The device also incorporates a quantity of fluorescent dye material, and in this example it is incorporated in the reflector 39. Furthermore, it is preferable that the reflector 39 should to some extent conserve the polarization of light incident thereupon.

The liquid crystal material may be the mixture:
4, 4' n-pentyl cyanobiphenyl
+0.2% w/w of cholesteryl monanoate in a 12 µm thick layer device The pleochroic dye may be the anthraquinone dye "D16" (supplied by BDH Chemicals Ltd)

The coloured polarizer 37 may be of polyvinyl alcohol sheet which has been impregnated with the pleochroic dye and stretched so that the dye molecules are aligned with their long axes in the direction of applied stress.

When white light is incident upon the front of the device, it is propagated through the front neutral polarizer 35 and emerges plane polarized in the direction of polarization defined by polarizer 35. On propagation through the liquid crystal layer, and in the absence of applied electric field, the plane of polarization of this light is rotated through 90° and the light emerges with a plane of polarization parallel to the long axes of the pleochroic dye molecules contained in rear coloured polarizer 37. Those components of light in the lower part of the visible spectrum (red to yellow) are then strongly attenuated according to the absorption properties of the pleochroic dye, whereas those components in the upper part of the visible spectrum (green to blue) are then propagated with little or no attenuation. This light then interacts with the fluorescent dye molecules and the spectral content is modified by fluorescent conversion, the green-to-blue components being diluted by conversion, in part, to red-to-yellow components. This diluted light is reflected back through rear polarizer 37, where some of the fluorescent light of one polarization is absorbed, and the remainder is propagated to the part of the device where the remaining fluorescent light is absorbed in the front polarizer. This light thus defines, a dark green-to-blue, background.

When an electric field of suitable magnitude is applied across the layer 33 of liquid crystal material lying between electrode display portions 27a, 29a, the long molecular axes of the liquid crystal material tilt to align parallel with the field, defining a bright state region 33b. When light propagates through this region, the plane of polarization is conserved. As above, light components in the upper part of the spectrum are propagated through polarizer 37 with little or no attenuation, light components in the lower part of the visible spectrum are attenuated, but to a much weaker degree than before since, in this case, the plane of polarization of the light is transverse to the long axes of the pleochroic dye molecules. The spectral content of the light propagated through polarizer 37 is again modified by partial fluorescent conversion, the added fluorescent components in this case supplementing those red-to-yellow components already present and not absorbed. Following reflection at reflector 39, the light is propagated back through the device, the spectral content again being modified by weak attenuation in polarizer 37 for one plane of polarization, and by strong attenuation for the orthogonal plane of polarization.

The character "A" corresponding to the bright state region 33b, may be thus observed. The spectral absorbances and the quantities of the pleochroic dye, and the fluorescent material, are balanced so that this bright state is of approximately neutral tint.

It will be appreciated that with 90° rotation of either polarizer 35, or polarizer 37, the roles of the bright and dark states are reversed. Thus the character "A" also may be depicted as a dark character against a bright and neutral background and, in any case, the front, neutral, polarizer 35 and rear, coloured polarizer 37 may be interchanged. An alternative type of reflector with its own polarizing properties, as taught in UK Patent No 1509180 but including fluorescent dye in place of pleochroic dye, is preferred, and for the following reason. Where the colour polariser 35 precedes the liquid crystal layer as above, light emerging from the liquid crystal cell 21 is polarised in one of two planes according to whether it has passed through a region of the liquid crystal layer which is, or is not, turned on by the electric field. By replacing the rear neutral polarizer using an anisotropic fluorescent reflector, ie a reflector in which the fluorescent dye molecules are elongate and aligned with their long molecular axes lying parallel and in the plane of the reflector, and aligning the reflector to give maximum absorption and fluorescent conversion corresponding to the bright state, neutral tone may be achieved with little absorption of the fluorescent light.

If an isotropic reflector were used, in conjunction with the rear neutral polarizer, rather more absorption of the fluorescent light would be unavoidable.

The anisotropic fluorescent reflector may also be used to advantage merely as a reflector behind a coloured display consisting of a neutral polarizer 35 a liquid crystal cell 21 and a coloured polarizer 37, since for the correct orientation of the fluorescent reflector the plane polarized fluorescent light can pass back through the display in the bright state with little absorption.

I claim:

1. A liquid crystal display device comprising:
   a liquid crystal cell including front and rear insulating substrates arranged in parallel, each with an inwardly facing surface bearing an electrode structure, and contained between the substrates, a layer of liquid crystal material, the cell being arranged so that the device is capable of being divided into dark and bright optical state regions upon application of an appropriate electric field across the layer when a potential difference is applied between the electrode structures;
   a reflector arranged for reflecting light incident upon the cell and propagated therethrough;
   pleochroic means, including at least one pleochroic material;
   fluorescent means, including at least one fluorescent material, the fluorescent means having an optical absorbtion band lying approximately within the optical transmission band of the pleochroic means, the fluorescent means also having a corresponding fluorescence emission band lying approximately within the optical absorbtion band of the pleochroic means; and wherein, the pleochroic means and the fluorescent means are capable of co-operating and are arranged to co-operate so that when light is incident upon the cell and an appropriate electrical field is applied across the layer, light propagated to an observer from any bright state region of the device is of approximately neutral tint.

2. A display device according to claim 1 wherein the fluorescent means includes the reflector, the reflector incorporating at least one fluorescent material.

3. A display device according to claim 1 wherein the pleochroic means includes the liquid crystal layer, the layer incorporating at least one dissolved pleochroic dye, molecules of the pleochroic dye being capable of alignment with molecules of the liquid crystal material.

4. A display device according to claim 1 wherein both the pleochroic means and the fluorescent means include the liquid crystal layer, the layer incorporating at least one dissolved pleochroic dye and at least one dissolved fluorescent dye, molecules of the dyes being capable of alignment with molecules of the liquid crystal material.

5. A liquid crystal display device comprising:
   a liquid crystal cell including front and rear polarizers, and between these polarisers front and rear insulating substrates arranged in parallel, each with an inwardly facing surface bearing an electrode structure, and contained between the substrates, a layer of liquid crystal material, the cell being arranged so that the device is capable of being divided into dark and bright optical state regions upon application of an appropriate electric field across the layer when a potential difference is applied between the electrode structures;
   a reflector arranged for reflecting light incident upon the cell and propagated therethrough;
   pleochroic means, including at least one pleochroic material;
   fluorescent means, including at least one fluorescent material, the fluorescent means having an optical absorbtion band lying approximately witin the optical transmission band of the pleochroic means, the fluorescent means also having a corresponding fluorescence emission band lying approximately within the optical absorbtion band of the pleochroic means; and wherein, the pleochroic means and the fluorescent means are capable of co-operating and are arranged to co-operate so that when light is incident upon the cell and an appropriate electrical field is applied across the layer, light propagated to an observer from any bright state region of the devie is of approximately neutral tint.

6. A display device according to claim 5 wherein the pleochroic means includes at least one of the two polarizers, this polarizer incorporating at least one pleochroic material, molecules of this pleochroic material being aligned in the direction of polarization defined by this polarizer.

7. A display device according to claim 5 wherein the fluorescent means includes the rear polarizer, the rear polarizer including at least one fluorescent material, the fluorescent material having molecules aligned in the direction of polarization defined by the rear polarizer.

8. A liquid crystal display device comprising: a liquid crystal cell including a front polarizer, and behind the front polarizer, front and rear insulating substrates arranged in parallel, each with an inwardly facing surface bearing an electrode structure, and contained between the substrates, a layer of liquid crystal material, the cell being arranged so that the device is capable of being divided into dark and bright optical state regions upon application of an appropriate electric field across the layer when a potential difference is applied between the electrode structures; pleochroic means, including at least one pleochroic material; and fluorescent means including a reflector incorporating at least one fluorescent material, this fluorescent material having molecules aligned in parallel relative to one another, and lying in the plane of the reflector; wherein the pleochroic means and the fluorescent means are capable of co-operating and are arranged to co-operate so that when light is incident upon the cell and an appropriate electrical field is applied across the layer, light propagated to an observer from any bright state region of the device is of approximately neutral tint.

9. A liquid crystal display device comprising:
a liquid crystal cell capable of being electrically addressed to provide a display divided into dark and bright optical state regions,
a reflector arranged to reflect light incident upon the cell and propagated therethrough;
pleochroic means, including a pleochroic dye having the formula:

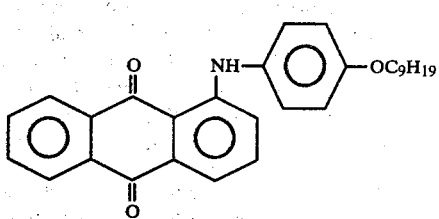

fluorescent means, including a fluorescent dye having the formula:

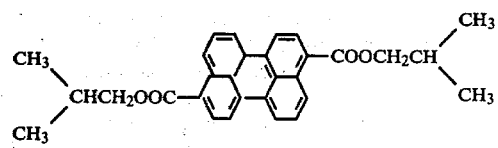

and wherein the pleochroic means and the fluorescent means are capable of co-operating and are arranged to co-operate so that when light is incident upon the cell and an appropriate electrical field is applied across the layer, light propagated to an observer from any bright state region of the device is of approximately neutral tint.

10. A display device according to claim 9 wherein the fluorescent means also includes the reflector, the reflector incorporating a fluorescent dye having the formula:

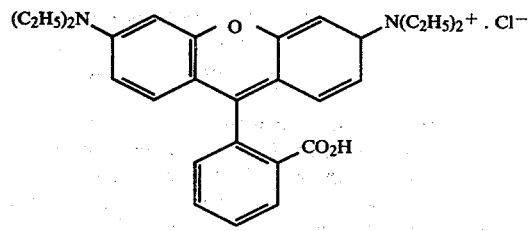

* * * * *